(12) United States Patent
Yamagiwa et al.

(10) Patent No.: US 8,985,575 B2
(45) Date of Patent: Mar. 24, 2015

(54) IMAGE FORMING APPARATUS

(71) Applicant: Fuji Xerox Co., Ltd., Tokyo (JP)

(72) Inventors: Hidekazu Yamagiwa, Kanagawa (JP);
Hiroshi Kawamoto, Kanagawa (JP);
Akihiro Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 24 days.

(21) Appl. No.: 13/869,572

(22) Filed: Apr. 24, 2013

(65) Prior Publication Data
US 2014/0104629 A1    Apr. 17, 2014

(30) Foreign Application Priority Data

Oct. 12, 2012 (JP) ................. 2012-226510

(51) Int. Cl.
*B65H 31/00*     (2006.01)
*H04N 1/00*      (2006.01)
*B65H 29/12*     (2006.01)
*B65H 29/14*     (2006.01)
*B65H 29/70*     (2006.01)
*G03G 15/00*     (2006.01)
*B41J 13/10*     (2006.01)

(52) U.S. Cl.
CPC ......... *H04N 1/00615* (2013.01); *B65H 29/125* (2013.01); *B65H 29/14* (2013.01); *B65H 29/70* (2013.01); *G03G 15/6576* (2013.01); *B41J 13/106* (2013.01); *B65H 2301/51214* (2013.01); *B65H 2404/1314* (2013.01); *B65H 2511/13* (2013.01); *B65H 2511/514* (2013.01); *B65H 2513/108* (2013.01)
USPC ....................................... 271/209

(58) Field of Classification Search
CPC ................. B65H 2404/62; B65H 2404/622; B65H 2404/54; B65H 57/04; B65H 2407/51; B65H 2407/32; B65H 2404/1414
USPC .................................. 271/209, 220
See application file for complete search history.

(56) References Cited

U.S. PATENT DOCUMENTS

| | | | | | |
|---|---|---|---|---|---|
| 4,019,640 | A | * | 4/1977 | Marin et al. | 414/790 |
| 5,810,348 | A | * | 9/1998 | Scheufler | 271/213 |
| 6,902,161 | B2 | * | 6/2005 | Gordon et al. | 271/161 |
| 8,267,402 | B2 | * | 9/2012 | Saito | 271/301 |
| 2010/0032895 | A1 | * | 2/2010 | Sahara et al. | 271/314 |

FOREIGN PATENT DOCUMENTS

JP    2006-317704 A    11/2006

\* cited by examiner

*Primary Examiner* — Michael McCullough
*Assistant Examiner* — Howard Sanders
(74) *Attorney, Agent, or Firm* — Sughrue Mion, PLLC

(57) ABSTRACT

An image forming apparatus includes an image forming unit that forms an image on a recording medium, an output unit that outputs the recording medium on which the image has been formed while providing the recording medium with a wave-like shape in a direction that is substantially perpendicular to a transport direction of the recording medium, and a member having an opening through which the recording medium is output. The opening has a shape corresponding to the wave-like shape of the recording medium provided by the output unit.

9 Claims, 6 Drawing Sheets

FIG. 5

| OUTPUT ROLLER SPEED-UP RATE (%) | | EVALUATION OF SHEET STACKABILITY | | | | | | |
|---|---|---|---|---|---|---|---|---|
| | | 100 | 150 | 200 | 250 | 300 | 350 |
| NORMAL SHEET | 64 TO 105 g/m² | NG | OK | OK | OK | OK | OK |
| THICK SHEET 1 | 106 TO 169 g/m² | NG | NG | OK | OK | OK | OK |
| THICK SHEET 2 | 170 TO 256 g/m² | NG | NG | NG | NG | NG | OK |

# IMAGE FORMING APPARATUS

CROSS-REFERENCE TO RELATED APPLICATIONS

This application is based on and claims priority under 35 USC 119 from Japanese Patent Application No. 2012-226510 filed Oct. 12, 2012.

BACKGROUND

Technical Field

The present invention relates to an image forming apparatus.

SUMMARY

According to an aspect of the invention, an image forming apparatus includes an image forming unit that forms an image on a recording medium, an output unit that outputs the recording medium on which the image has been formed while providing the recording medium with a wave-like shape in a direction that is substantially perpendicular to a transport direction of the recording medium, and a member having an opening through which the recording medium is output. The opening has a shape corresponding to the wave-like shape of the recording medium provided by the output unit.

BRIEF DESCRIPTION OF THE DRAWINGS

An exemplary embodiment of the present invention will be described in detail based on the following figures, wherein:

FIG. 5 is a table showing the relationship among the basis weight of a sheet, the speed-up rate of the output roller pair, and the sheet stackability;

DETAILED DESCRIPTION

Figure 1:
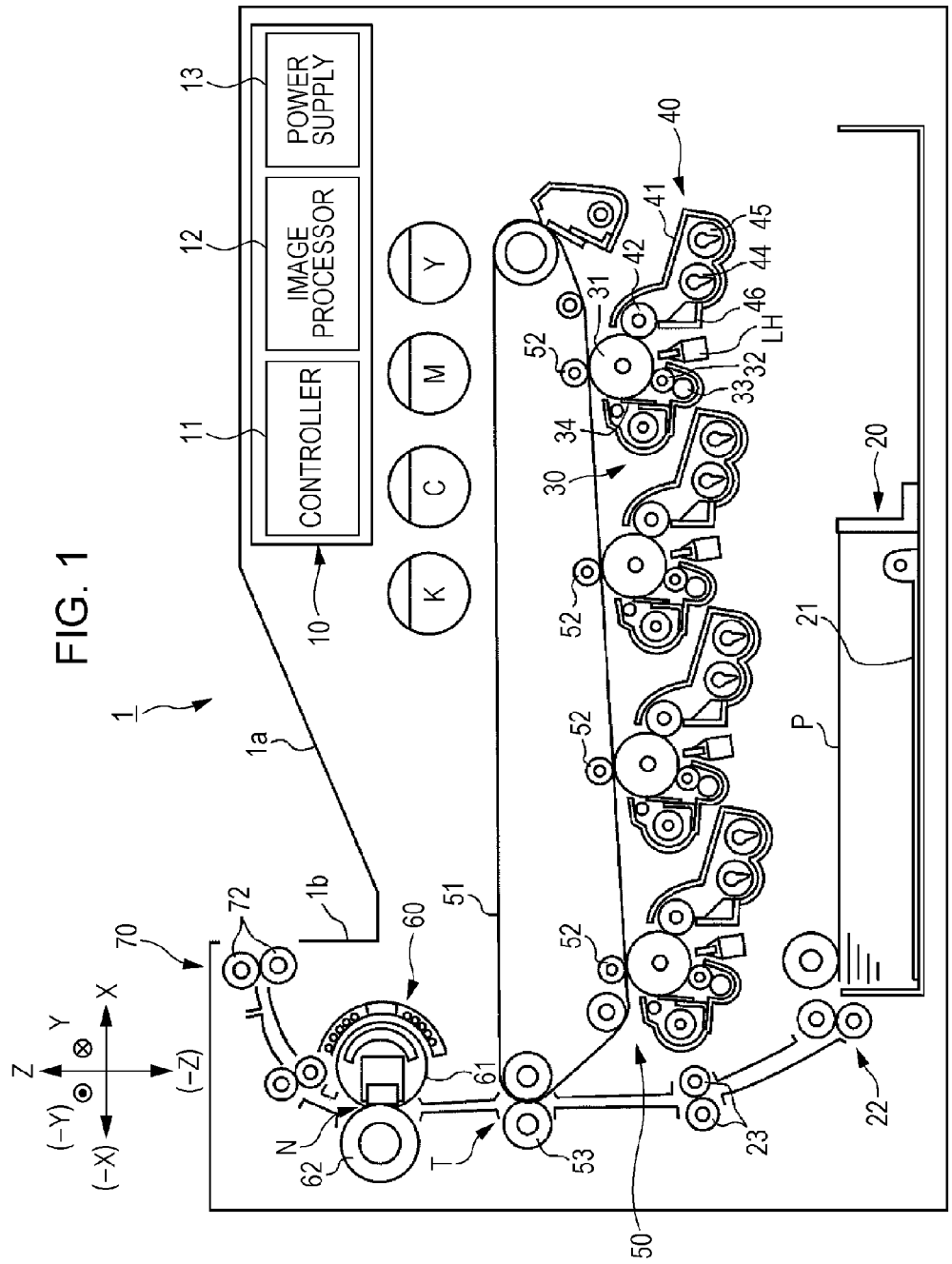
FIG. 1 is a sectional schematic view illustrating the internal structure of an image forming apparatus according to the exemplary embodiment.

Hereinafter, an exemplary embodiment of the present invention and an example of the exemplary embodiment will be described in detail with reference to the drawings. The present invention is not limited to the exemplary embodiment and the example.

The drawings are schematic, the proportions of the dimensions of members of the apparatus illustrated in the drawings are not the same as those of actual members, and members that are not necessary for the description are omitted.

For ease of understanding the following description, the front-back direction in the drawings will be referred to as the X-axis direction, the left-right direction will be referred to as the Y-axis direction, and the vertical direction will be referred to as the Z-axis direction.

(1) Overall Structure and Operation of Image Forming Apparatus

FIG. 1 is a sectional schematic view illustrating the internal structure of an image forming apparatus 1 according to the present exemplary embodiment.

The overall structure and the operation of the image forming apparatus 1 will be described with reference to the drawings.

The image forming apparatus 1 includes a control device 10, a sheet feeder 20, photoconductor units 30, developing devices 40, a transfer device 50, a fixing device 60, and a sheet output device 70. An output tray 1a is formed on an upper surface (facing in the Z direction) of the image forming apparatus 1. A sheet P on which an image has been recorded is output to and stacked on the output tray 1a.

The control device 10 includes a controller 11 that controls the operation of the image forming apparatus 1, an image processor 12 that is controlled by the controller 11, a power supply 13, and the like. The power supply 13 supplies voltages to charging rollers 32, developing rollers 42, first transfer rollers 52, a second transfer roller 53, and the like, which will be described below.

The image processor 12 converts print information that is input from an external information transmitting device (such as a personal computer) into image information for forming a latent image, and outputs driving signals to exposure devices LH at predetermined timings. In the present exemplary embodiment, each of the exposure devices LH is an LED head in which light emitting diodes (LEDs) are linearly arranged.

The sheet feeder 20 is disposed in a bottom portion of the image forming apparatus 1. The sheet feeder 20 includes a sheet stack plate 21, on which sheets P, each of which is an example of a recording medium, are stacked. Regulation plates (not shown) regulate the positions of the sheets P, which are stacked on the sheet stack plate 21, in the width direction. A pick-up unit 22 picks up the sheets P one by one from the top of the stack, and feeds the picked up sheet P forward (in the −X direction). Then, the sheet P is transported to a nip portion of a registration roller pair 23.

The photoconductor units 30 are disposed side by side above (in the Z direction from) the sheet feeder 20. The photoconductor units 30 each include a photoconductor drum 31, which is an example of an image carrier that rotates. Around each photoconductor drum 31 in the rotation direction, the charging roller 32, the exposure device LH, the developing device 40, the first transfer roller 52, and a cleaning blade 34 are arranged. A cleaning roller 33, which cleans a surface of the charging roller 32, is disposed so as to face and contact the charging roller 32.

The developing device 40 includes a development housing 41 in which a developer is contained. The developing roller 42 and a pair of augers 44 and 45 are disposed in the development housing 41. The developing roller 42 is disposed so as to face the photoconductor drum 31. The augers 44 and 45, which are disposed behind and diagonally below the developing roller 42, agitate and transport the developer toward the developing roller 42. A layer regulation member 46, which is disposed near the developing roller 42, regulates the layer thickness of the developer.

The developing devices 40 are substantially the same except that the colors of the developers contained in the development housings 41 are different. The developing devices 40 respectively form yellow (Y), magenta (M), cyan (C), and black (K) toner images.

The charging roller 32 charges the surface of the photoconductor drum 31, which rotates. The exposure device LH emits latent-image-forming light that forms an electrostatic latent image on the surface of the photoconductor drum 31. The developing roller 42 develops the electrostatic latent image, which has been formed on the photoconductor drum 31, thereby forming a toner image.

The transfer device 50 includes an intermediate transfer belt 51 and the first transfer rollers 52. Color toner images, which have been formed on the photoconductor drums 31 of the photoconductor units 30, are transferred to the intermediate transfer belt 51 so as to overlap each other. The first transfer rollers 52 successively transfer (first-transfer) the color toner images, which have been formed by the photoconductor units 30, to the intermediate transfer belt 51. The transfer device 50 further includes the second transfer roller 53, which simultaneously transfers (second-transfers) the color toner images, which have been transferred to the intermediate transfer belt 51, to the sheet P, which is an example of a recording medium.

The power supply 13, which is controlled by the controller 11, or the like supplies a predetermined first-transfer voltage to the first transfer rollers 52. The first transfer rollers 52 successively and electrostatically transfer (first-transfer) the color toner images, which have been formed on the photoconductor drums 31 of the photoconductor units 30, to the intermediate transfer belt 51. As a result, the color toner images overlap each other, thereby forming overlapping toner images. As the intermediate transfer belt 51 moves, the overlapping toner images on the intermediate transfer belt 51 are transported to a region in which the second transfer roller 53 is disposed (second-transfer region T). At the time at which the overlapping toner images are transported to the second-transfer region T, a sheet P is supplied to the second-transfer region T from the sheet feeder 20. The power supply 13, which is controlled by the controller 11, or the like supplies a predetermined second-transfer voltage to the second transfer roller 53. The second transfer roller 53 simultaneously transfers the overlapping toner images on the intermediate transfer belt 51 to the sheet P, which has been fed by the registration roller pair 23 and guided by transport guides.

The cleaning blade 34 removes residual toner from the surface of the photoconductor drum 31, and the residual toner is recovered to a waste toner container (not shown). The charging roller 32 recharges the surface of the photoconductor drum 31. The cleaning roller 33, which rotates while being in contact with the charging roller 32, wipes residual matters that have not been removed by the cleaning blade 34 and have adhered to the charging roller 32 off the charging roller 32, and the residual matters are accumulated.

The fixing device 60 includes a fixing belt 61 and a press roller 62. The fixing belt 61 is an endless belt that rotates in one direction. The press roller 62 is in contact with a peripheral surface of the fixing belt 61 and rotates in one direction. A nip portion N (fixing region) is formed in a region in which the fixing belt 61 and the press roller 62 are pressed against each other.

The sheet P, to which the transfer device 50 has transferred a toner image, is transported to the fixing device 60 via the transport guides before the toner image is fixed. The fixing belt 61 and the press roller 62 apply pressure and heat to the sheet P, which has been transported to the fixing device 60, so that a toner image is fixed onto the sheet P.

Transport guides 71a and 71b of the sheet output device 70 guide the sheet P, on which a fixed toner image has been formed. An output roller pair 72 outputs the sheet P to the output tray 1a on the upper surface of the image forming apparatus 1.

(2) Structure and Operation of Output Device

Figure 2:
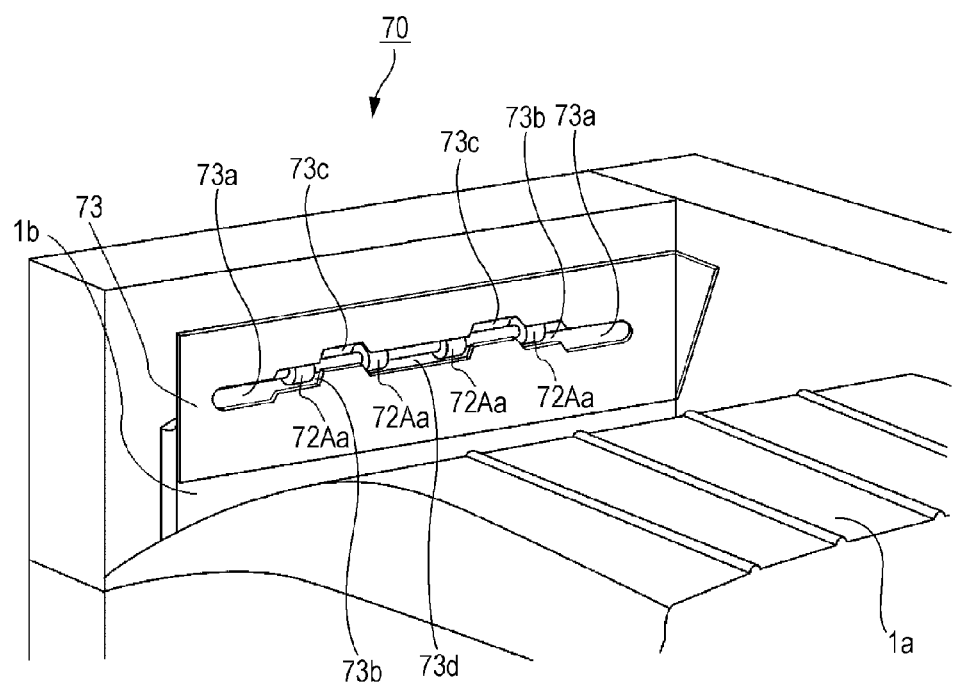
FIG. 2 is a perspective view of a sheet output device of a sheet output section of the image forming apparatus, seen from the output side.
Figure 3:
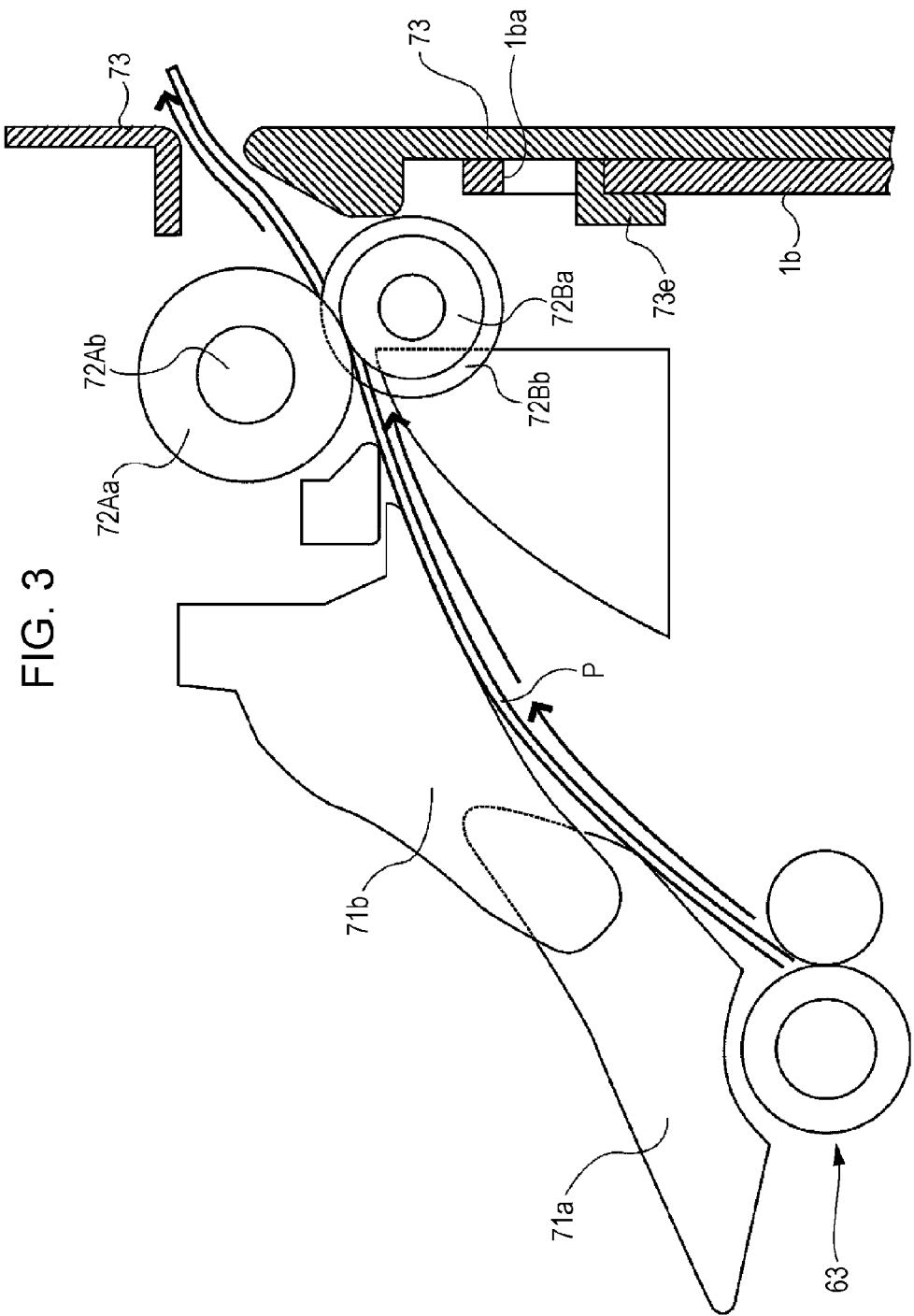
FIG. 3 is a schematic longitudinal sectional view illustrating the structure of the sheet output section of the image forming apparatus and a sheet transport path along which a sheet is transported from a nip portion of a fixing device to a shield cover.
Figure 7:
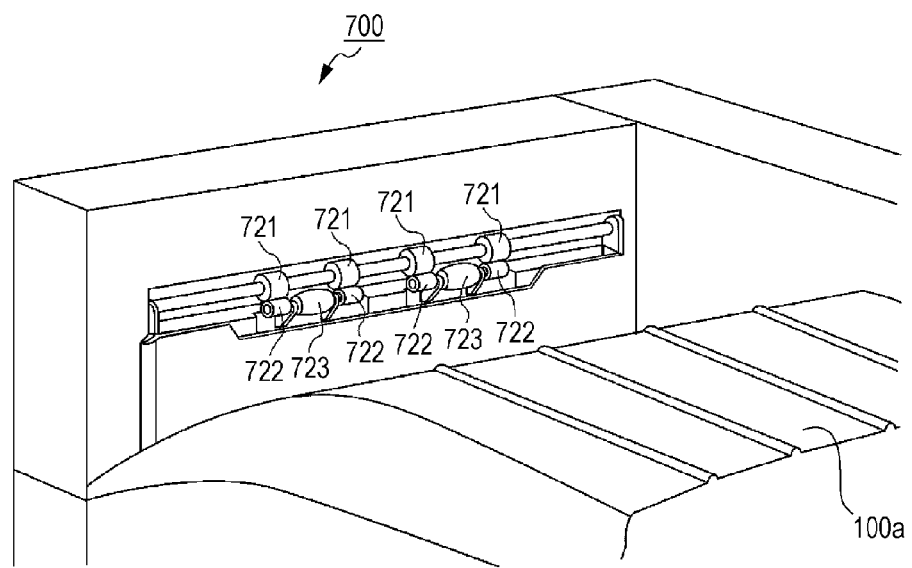
FIG. 7 is a perspective view of a sheet output section of an image forming apparatus according to a comparative example, seen from the output side.

FIG. 2 is a perspective view of the sheet output device 70 of a sheet output section of the image forming apparatus 1 according to the present exemplary embodiment, seen from the output side. FIG. 3 is a schematic longitudinal sectional view of the sheet output device 70. FIG. 7 is a perspective view of a sheet output section of an image forming apparatus 100 according to a comparative example, seen from the output side.

(2.1) Sheet Output Device According to Comparative Example

Before describing the structure of the sheet output device 70, which is an example of a sheet output unit according to the present exemplary embodiment, a problem with the image forming apparatus 100 according to a comparative example, in which a shield member is not disposed at an opening of a sheet output section, will be described.

In the image forming apparatus 100, the sheets P on which toner images have been formed are stacked on an output tray 100a. A user may take the sheets P from the front side of the image forming apparatus 100.

An opening is formed in a sheet output device 700, and an output roller pair 720 outputs a sheet on which a toner image has been formed by a fixing device (not shown, the same as the fixing device 60 in FIG. 1) to the output tray 100a through the opening.

The output roller pair 720 includes drive rollers 721 that are rotated, pinch rollers 722 that are rotatably pressed against the drive rollers 721, corrugation rollers 723 that are disposed between the pinch rollers 722. When the output roller pair 720 rotates, the sheet P is output to the output tray 100a.

Figure 6:
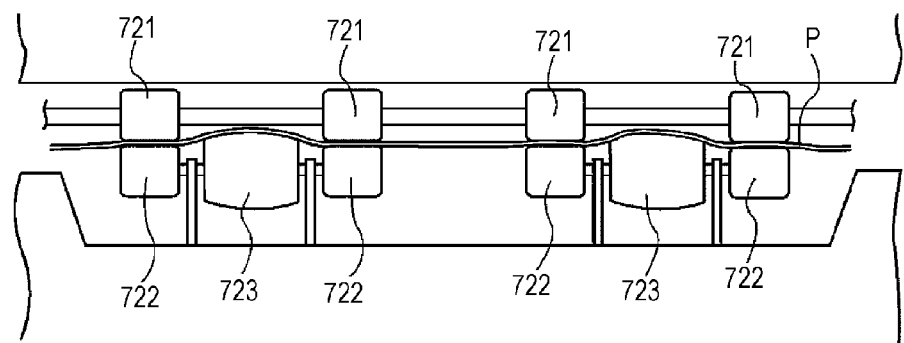
FIG. 6 is a schematic view illustrating corrugation of a sheet formed by the output roller pair.

As schematically illustrated in FIG. 6, the output roller pair 720 has a corrugation section that forms plural vertical recesses, which extend in the output direction of the sheet P that is output, in the sheet P in order to increase the stiffness of the sheet P and improve the transport stability of the sheet P.

To be specific, middle portions of the corrugation rollers 723, which are disposed between the pinch rollers 722, have outside diameters that are larger than those of the pinch rollers 722. With such a structure, a wave-like shape is formed in a direction perpendicular to the output direction when the sheet P is output, and thereby the stiffness of the sheet P is increased.

Because of this configuration, the opening in the sheet output device 700 has a dimension in the vertical direction such that peaks and valleys of the wave-shaped portion of the sheet P do not contact the upper and lower edges of the opening. The opening is open irrespective of whether an output operation is being performed. Therefore, a foreign object may enter the image forming apparatus through the opening and may cause damage to internal devices such as the fixing device 60, or may cause paper jam.

(2.2) Sheet Output Device According to Exemplary Embodiment

As illustrated in FIGS. 2 and 3, the sheet output device 70 according to the present exemplary embodiment includes the transport guides 71a and 71b, the output roller pair 72, and a shield cover 73. The transport guides 71a and 71b guide the sheet P, onto which the fixing device 60 has fixed a toner image, to the output roller pair 72. The output roller pair 72 is rotated by a driving source (not shown).

(2.2.1) Structure of Output Roller Pair

The output roller pair 72 includes a drive roller 72A and an output roller 72B. The output roller pair 72 outputs the sheet P, onto which the fixing device 60 has fixed a toner image, to the outside of the apparatus while deforming the sheet P so that the cross section of the sheet P in the width direction has a wave-like shape.

The drive roller 72A includes a shaft 72Ab and plural individual rollers 72Aa. The shaft 72Ab extends in the width direction of the sheet P. The individual rollers 72Aa are cylindrical rollers that are arranged in the width direction of the sheet P with distances therebetween. The shaft 72Ab is rotatably supported by side panels of the sheet output device 70 and rotated by a driving source (not shown) such as a motor.

As illustrated in FIG. 3, the output roller 72B includes pinch rollers 72Ba and corrugation rollers 72Bb. The pinch rollers 72Ba are rotatably pressed against the individual rollers 72Aa. The corrugation rollers 72Bb are disposed between the pinch rollers 72Ba so as to be rotatable.

The outside diameter of middle portions of the corrugation rollers 72Bb is larger than the outside diameter of the pinch rollers 72Ba. The corrugation rollers 72Bb form corrugation (wave-like shape) of the sheet P at nip portions between the individual rollers 72Aa and the pinch rollers 72Ba when seen in a direction perpendicular to the width direction of the sheet P (see FIG. 6).

The output roller 72B is disposed below the drive roller 72A so as to face the drive roller 72A. The drive roller 72A and the output roller 72B constitute the output roller pair 72.

(2.2.2) Structure of Shield Cover

As illustrated in FIG. 2, the shield cover 73 has a wave-shaped opening. The shape of the opening matches the corrugated shape (wave-like shape) of the sheet P formed by the output roller pair 72. That is, openings 73a, 73b, 73c, 73d, 73c, 73b, and 73a are continuously formed in the shield cover 73 in the width direction of the sheet P, which is perpendicular to the output direction of the sheet P, so as to form an output opening having a wave-like shape, through which the sheet P is output.

The width of each of the openings 73a, 73b, 73c, and 73d (in the Z direction) is in the range of, for example, 4 to 5 mm. If the width of the opening is smaller than 4 mm, paper jam is likely to occur at the opening due to corrugation (wave-like shape) of the sheet P. If the width of the opening is larger than 5 mm, a foreign object may enter through the opening and may cause damage to internal devices, such as the fixing device 60, or may cause paper jam.

The distances from the nip portions between the individual rollers 72Aa and the pinch rollers 72Ba of the output roller pair 72 to an edge of the opening in the shield cover 73 in the sheet output direction (in the X direction) is equal to or smaller than 15 mm. If this distance is large, the trailing end of the sheet P that is output remains at the edge of the opening in the shield cover 73, and sheet output failure is likely to occur (hereinafter, referred to as "incomplete output of a trailing end").

The shield cover 73 is attached to a wall 1b. The wall 1b is integrally formed with the output tray 1a and is disposed on the output side below the output roller pair 72 (in the –Z direction). The wall 1b prevents the sheet P that is output from returning toward the output roller pair 72.

As with the wall 1b, an outer side surface of the shield cover 73 functions to prevent the sheet P that is output from returning toward the output roller pair 72. Therefore, it is desirable that the outer side surface of the shield cover 73 do not have protrusions or protruding portions.

The method for fixing shield cover 73 to the wall 1b is not particularly limited. For example, an engagement opening 1ba may be formed in a part of the wall 1b, an engagement hook 73e may be formed on a surface of the shield cover 73 that faces the wall 1b, and the engagement hook 73e may be inserted into the engagement opening 1ba so that the shield cover 73 is removably engaged with the wall 1b. With this method, it is possible to attach the shield cover 73 to an image forming apparatus that has been marketed and installed (see FIG. 3).

(2.2.3) Speed Control of Output Roller Pair

Figure 4:
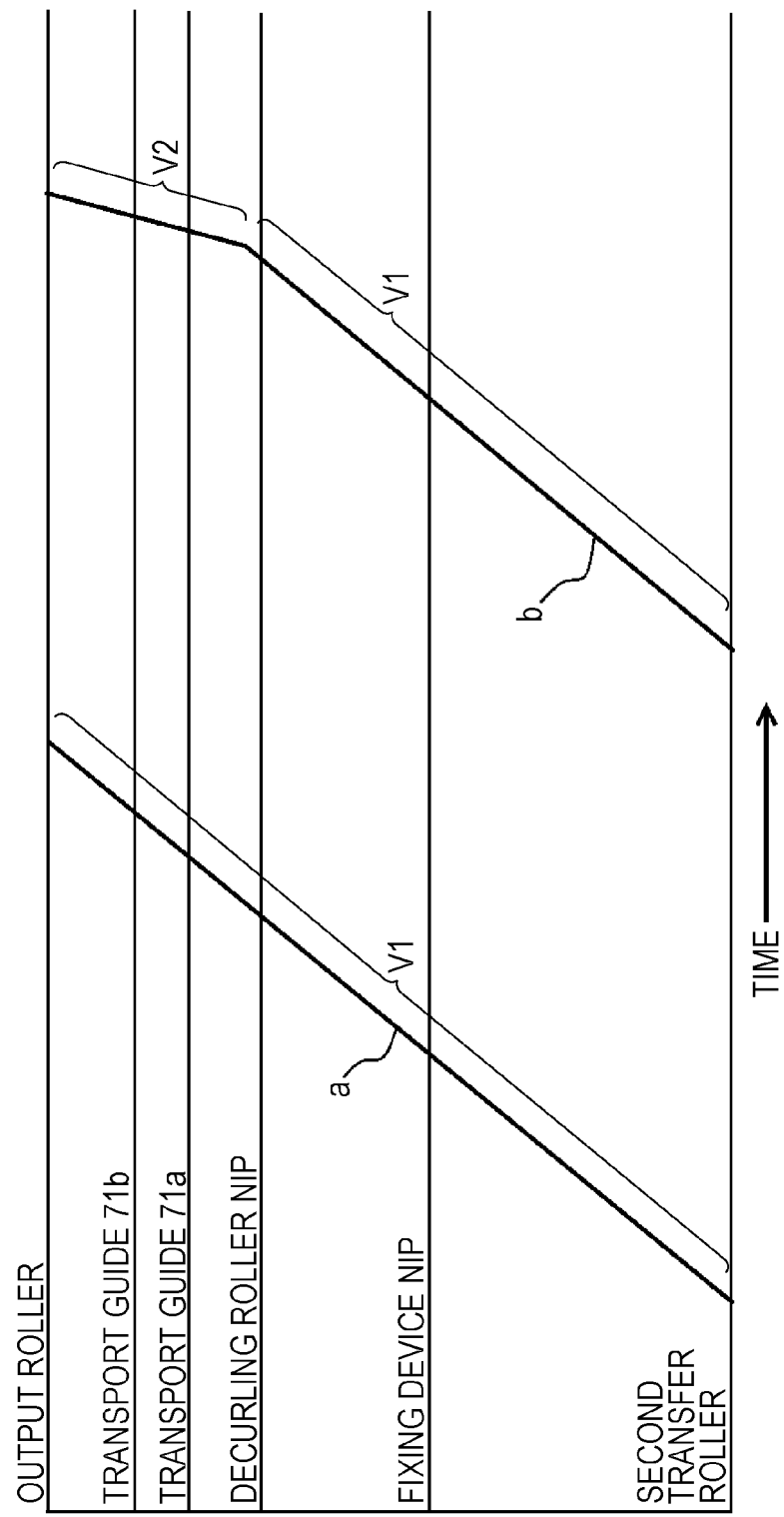
FIG. 4 is a timing chart of a sheet transport operation with which a sheet is transported from a second transfer roller to an output roller pair via the nip portion of the fixing device.

FIG. 3, which is a schematic longitudinal sectional view of the sheet output device 70, also illustrates a sheet transport path along which the sheet P is transported from a nip portion of the fixing device 60 to the shield cover 73. FIG. 4 is a timing chart of a sheet transport operation with which a sheet is transported from the second transfer roller 53 to the output roller pair 72 via the nip portion of the fixing device 60.

Hereinafter, control of sheet transport speed that is performed by the controller 11 when the sheet output device 70 outputs a sheet will be described with reference to the drawings. The controller 11 is an example of a rotation speed controller.

A decurling roller pair 63 is disposed downstream of the nip portion of the fixing device 60. The decurling roller pair 63 decurls the sheet P onto which an image has been fixed (that is, the decurling roller pair 63 curls the sheet P in a direction opposite to the direction in which the sheet P has been curled during the fixing operation). The decurling roller pair 63 decurls the sheet P, which has been curled toward the side on which a toner image is formed, and the transport guides 71a and 71b guide the sheet P so that the sheet P is transported to the nip portion of the output roller pair 72.

In FIG. 4, a line "a" represents change in the position of the front end of the sheet P with respect to time, and a line "b" represents change in the position of the trailing end of the sheet P with respect to time. As shown by the line a, the sheet P is transported at a predetermined sheet transport speed V1 throughout the period from a time at which the leading end of the sheet P passes the second transfer roller 53 to a time at which the leading end of the sheet P is output through the opening in the shield cover 73. During the period, the leading end of the sheet P passes the second transfer roller 53, through the nip portion of the fixing device 60, through the nip portion of the decurling roller pair 63, through spaces between the transport guides 71a and 71b, and through the nip portion of the output roller pair 72.

As shown by the line b, the speed of the sheet P is increased to V2 at a time at which the trailing end of the sheet P has passed through the nip portion of the decurling roller pair 63.

Depending on the size of the transported sheet P, which is one of the characteristics of the sheet P, even after the front end of the sheet P has passed through the nip portion in the output roller pair 72, the trailing end of the sheet P may be still nipped in the nip portion at the second transfer roller 53, the nip portion in the fixing device 60, the nip portion of the decurling roller pair 63, or the like.

Therefore, the transport speed of the sheet P that is output is increased at a time at which the trailing end of the sheet P has passed through the nip portion of the decurling roller pair 63.

The time at which the trailing end of the sheet P has passed through the nip portion of the decurling roller pair 63 is determined by, for example, the controller 11 on the basis of information on sheet characteristics. The controller 11, which controls the operation of the image forming apparatus 1, is an example of a rotation speed controller.

Alternatively, a sheet output sensor for detecting a sheet may be disposed downstream of the nip portion of the fixing device 60, and the time at which the trailing end of the sheet P has passed through the nip portion may be determined as a time that is a predetermined time after a time at which the sheet output sensor detects the front end or the trailing end of the transported sheet P.

The increased sheet transport speed V2 is determined in accordance with the thickness of the sheet P that is output. To be specific, the rate of increase in the speed is determined for each of a normal sheet (having a basis weight in the range of 64 to 105 $g/m^2$), a thick sheet 1 (having a basis weight in the range of 106 to 169 $g/m^2$), and a thick sheet 2 (having a basis weight in the range of 170 to 256 $g/m^2$).

EXAMPLES

FIG. 5 is a table showing the relationship among the basis weight of a sheet, the speed-up rate (V2/V1×100%) of the output roller pair 72, and the sheet stackability. The sheet stackability is evaluated on the basis of whether the trailing end of the sheet P remains at the edge of the opening in the shield cover 73 and is not output to the output tray 1a (hereinafter referred to as "incomplete output of a trailing end") and whether sheets are neatly stacked on the output tray 1a.

Regarding the image forming apparatus 1 according to the exemplary embodiment, the sheet transport speed V1 is determined in accordance with the basis weight of the sheet P so that a toner image is appropriately fixed onto the sheet P by the fixing device 60. Therefore, when the sheet P has a large basis weight, that is, when the sheet P is a thick sheet, the sheet transport speed V1 is set lower than that of the normal sheet so that fixing is reliably performed.

As the sheet transport speed V1 decreases, the inertia of the sheet P that is output from the output roller pair 72 decreases, and it becomes more likely that incomplete output of a trailing end of a sheet occurs.

As shown in FIG. 5, for a normal sheet (having a basis weight in the range of 64 to 105 $g/m^2$), by increasing the sheet transport speed to 150% of the normal transport speed V1, incomplete output of a trailing end does not occur and good sheet stackability is achieved.

For a thick sheet 1 (having a basis weight in the range of 106 to 169 $g/m^2$), by increasing the sheet transport speed to 200% of the normal sheet transport speed V1 for the thick sheet 1, incomplete output of a trailing end does not occur and good sheet stackability is achieved. For a thick sheet 2 (having a basis weight in the range of 170 to 256 $g/m^2$), by increasing the sheet transport speed by 350% of the normal sheet transport speed V1 for the thick sheet 2, incomplete output of a trailing end of a sheet does not occur and good sheet stackability is achieved. In any the above cases, the sheets are neatly stacked on the output tray 1a.

(3) Operation

The sheet output device 70 according to the present exemplary embodiment outputs the sheet P, onto which the fixing device 60 has fixed a toner image, to the output tray 1a using the output roller pair 72. The opening in the sheet output device 70 is covered by the shield cover 73, which has a wave-shaped opening that matches the corrugated shape (wave-like shape) of the sheet P formed by the output roller pair 72.

That is, openings 73a, 73b, 73c, 73d, 73c, 73b, and 73a are continuously formed in the shield cover 73 in the width direction of the sheet P, which is perpendicular to the output direction of the sheet P, so as to form an output opening having a wave-like shape, through which the sheet P is output.

Therefore, protrusions and recesses of the corrugation (wave-like shape) of the sheet P do not collide with an edge of the shield cover 73, and it is possible to output the sheet P while maintaining the stiffness of the sheet P, which is provided by the output roller pair 72.

When seen in a direction perpendicular to the width direction of the sheet P, the edge of the shield cover 73 and the nip portion of the output roller pair 72 overlap each other. Accordingly, it is possible to suppress entry of a foreign object through the opening and to prevent damage to internal devices, such as the fixing device 60, and occurrence of paper jam.

The wall 1b, which is integrally formed with the output tray 1a, is disposed on the output side below the output roller pair 72 (in the −Z direction) and prevents the sheet P that is output from returning toward the output roller pair 72. The engagement hook 73e is formed on a surface of the shield cover 73 that faces the wall 1b, and the shield cover 73 is removably engaged with the wall 1b using the engagement hook 73e.

With such a fixing structure, it is possible to attach the shield cover 73 to an image forming apparatus that has been marketed and installed.

The rotation speed controller increases the rotation speed of the output roller pair 72 at the time at which the trailing end of the sheet P has passed through the nip portion of the decurling roller pair 63, and thereby the sheet transport speed is increased.

The sheet transport speed is increased to the sheet transport speed V2, which is determined in accordance with the thickness of the sheet P that is output. To be specific, the rate of increase in the sheet transport speed is determined for each of the normal sheet (having a basis weight in the range of 64 to 105 $g/m^2$), the thick sheet 1 (having a basis weight in the range of 106 to 169 $g/m^2$), and the thick sheet 2 (having a basis weight in the range of 170 to 256 $g/m^2$).

Therefore, incomplete output of a trailing end at the edge of the shield cover 73 does not occur, and it is possible to ensure good sheet stackability.

In the present exemplary embodiment, the image forming apparatus 1 is a color printer using an electrophotographic method. The present invention may be applied to another image forming apparatus, such as a copier, a facsimile machine, or a multifunctional machine; an image forming apparatus using a method other than the electrophotographic method, such as an inkjet method; and an output device connected to such an image forming apparatus or to another sheet handling device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image forming apparatus comprising:
    an image forming unit configured to form an image on a recording medium;
    an output unit configured to output the recording medium on which the image has been formed while providing the recording medium with a wave shape in a direction that is substantially perpendicular to a transport direction of the recording medium; and a member comprising an opening through which the recording medium, that is output from the output unit, is output, wherein the opening has a shape corresponding to the wave shape of the recording medium output by the output unit.

2. The image forming apparatus according to claim 1, wherein the member having the opening is a shield member that is removably engaged with a wall that prevents the recording medium that is output from returning toward the output unit.

3. The image forming apparatus according to claim 2, further comprising:

a rotation speed controller that controls an output speed of the output unit, wherein the rotation speed controller changes the output speed of the output unit at a time at which a trailing end of the recording medium on which an image has been formed has passed through a nip portion of a transport unit that is located immediately upstream of the output unit in the transport direction.

4. The image forming apparatus according to claim 3, wherein the rotation speed controller changes the output speed of the output unit on the basis of a type of the recording medium that is output to a sheet output tray.

5. The image forming apparatus according to claim 1, further comprising:

a rotation speed controller that controls an output speed of the output unit, wherein the rotation speed controller changes the output speed of the output unit at a time at which a trailing end of the recording medium on which an image has been formed has passed through a nip portion of a transport unit that is located immediately upstream of the output unit in the transport direction.

6. The image forming apparatus according to claim 5, wherein the rotation speed controller changes the output speed of the output unit on the basis of a type of the recording medium that is output to a sheet output tray.

7. The image forming apparatus according to claim 1, wherein the opening has a shape comprising a plurality of peaks and a plurality of valleys.

8. The image forming apparatus according to claim 1, wherein the opening has a corrugated shape.

9. An image forming apparatus comprising:

an image forming unit configured to form an image on a recording medium;

an output unit configured to output the recording medium on which the image has been formed while providing the recording medium with a wave shape in a direction that is substantially perpendicular to a transport direction of the recording medium; and a member comprising an opening through which the recording medium is output, wherein the opening has a shape corresponding to the wave shape of the recording medium output by the output unit, wherein the image forming apparatus further comprises a rotation speed controller that controls an output speed of the output unit, and wherein the rotation speed controller changes the output speed of the output unit at a time at which a trailing end of the recording medium on which an image has been formed has passed through a nip portion of a transport unit that is located immediately upstream of the output unit in the transport direction.

* * * * *